(12) United States Patent
Manahan et al.

(10) Patent No.: US 9,494,476 B2
(45) Date of Patent: Nov. 15, 2016

(54) INDICATOR DEVICE FOR AN ENCLOSURE WITH SEALING COMPOUND

(71) Applicants: Joseph Michael Manahan, Manlius, NY (US); David Carr Holloway, Clay, NY (US)

(72) Inventors: Joseph Michael Manahan, Manlius, NY (US); David Carr Holloway, Clay, NY (US)

(73) Assignee: Cooper Technologies Company, Houston, TX (US)

(*) Notice: Subject to any disclaimer, the term of this patent is extended or adjusted under 35 U.S.C. 154(b) by 0 days.

(21) Appl. No.: 14/814,286

(22) Filed: Jul. 30, 2015

(65) Prior Publication Data

US 2015/0338297 A1 Nov. 26, 2015

Related U.S. Application Data

(60) Continuation of application No. 13/158,115, filed on Jun. 10, 2011, now Pat. No. 9,111,425, which is a continuation-in-part of application No. 12/813,114, filed on Jun. 10, 2010, now Pat. No. 7,975,527, which is a division of application No. 11/960,904, filed on Dec. 20, 2007, now Pat. No. 7,757,623.

(51) Int. Cl.
*G01K 1/02* (2006.01)
*G01L 5/00* (2006.01)
*G08B 5/36* (2006.01)

(52) U.S. Cl.
CPC .. *G01L 5/00* (2013.01); *G08B 5/36* (2013.01)

(58) Field of Classification Search
CPC ........... G01L 5/14; G01L 1/247; G01L 1/24; G01L 5/00; G01N 33/383; C04B 40/0032; C08F 8/30

USPC ....... 73/54.03, 467, 762; 116/201, 200, 216; 361/600; 362/382
See application file for complete search history.

(56) References Cited

U.S. PATENT DOCUMENTS

| | | |
|---|---|---|
| 1,692,012 A | 11/1928 | Wells |
| 2,764,979 A | 10/1956 | Henderson |
| 2,805,523 A | 9/1957 | Springer |
| 3,233,459 A | 2/1966 | Gleason et al. |
| 3,452,706 A | 7/1969 | Vogt |
| 3,515,091 A | 6/1970 | Smith |
| 3,548,780 A | 12/1970 | Kliewer |
| 3,559,615 A | 2/1971 | Kliewer |
| 3,587,405 A | 6/1971 | Holmes |
| 3,765,025 A | 10/1973 | Zietzke et al. |
| 3,911,857 A | 10/1975 | Manuel |
| 3,965,741 A | 6/1976 | Wachtell et al. |
| 4,082,000 A | 4/1978 | Volk |
| 4,143,617 A | 3/1979 | Youngren |
| 4,156,891 A | 5/1979 | Roche |
| 4,183,536 A | 1/1980 | Platt |
| 4,356,790 A | 11/1982 | Gee |
| 4,362,121 A | 12/1982 | Pegram |
| 4,421,053 A | 12/1983 | Volk |
| 4,445,456 A | 5/1984 | Nelson |

(Continued)

*Primary Examiner* — Eric S McCall
*Assistant Examiner* — Mohammed E Keramet-Amircola
(74) *Attorney, Agent, or Firm* — King & Spalding LLP

(57) ABSTRACT

Indicator devices, systems, and methods are provided. Indicator devices include a housing having a bore and an indicating component placed therein. The indicator devices are activated in response to an increase in temperature or pressure. Indicator systems include an indicator device coupled to a housing, such as a conduit or enclosure. Methods include utilizing an indicator device to determine if an area within a conduit or enclosure has been sealed.

20 Claims, 14 Drawing Sheets

(56) References Cited

U.S. PATENT DOCUMENTS

| | | |
|---|---|---|
| 4,480,580 A | 11/1984 | Nalence |
| 4,512,278 A | 4/1985 | Winther |
| 4,539,929 A | 9/1985 | Sestak et al. |
| 4,649,854 A | 3/1987 | Janke et al. |
| 4,748,931 A | 6/1988 | Volk |
| 4,789,922 A | 12/1988 | Cheshire |
| 5,027,740 A | 7/1991 | Kramer et al. |
| 5,144,112 A | 9/1992 | Wyatt et al. |
| 5,144,880 A | 9/1992 | Schmit |
| 5,191,855 A | 3/1993 | Conforti |
| 5,537,950 A | 7/1996 | Ou-Yang |
| 5,616,157 A | 4/1997 | Mead et al. |
| 5,638,975 A | 6/1997 | Harris |
| 5,673,028 A | 9/1997 | Levy |
| 5,821,695 A | 10/1998 | Vilanilam et al. |
| 5,880,667 A | 3/1999 | Altavela et al. |
| 5,918,262 A | 6/1999 | Sanford |
| 5,957,531 A | 9/1999 | Kane et al. |
| 5,988,102 A | 11/1999 | Volk et al. |
| 6,230,649 B1 | 5/2001 | Yeung |
| 6,531,960 B1 | 3/2003 | Gladstone et al. |
| 6,609,865 B2 | 8/2003 | Daigneault |
| 6,635,020 B2 | 10/2003 | Tripp, Jr. et al. |
| 6,639,190 B2 | 10/2003 | Lerner |
| 6,651,834 B2 | 11/2003 | Wong |
| 6,700,100 B2 | 3/2004 | Lerner |
| 6,736,086 B2 | 5/2004 | Kaiser et al. |
| 6,848,389 B1 | 2/2005 | Elsasser et al. |
| 6,911,903 B2 | 6/2005 | Gladstone et al. |
| 7,013,833 B2 | 3/2006 | Lemberger et al. |
| 7,028,541 B2 | 4/2006 | Uleski et al. |
| 7,030,743 B2 | 4/2006 | Morris |
| 7,112,766 B2 | 9/2006 | Lerner |
| 7,204,199 B2 | 4/2007 | Ribi et al. |
| 7,268,660 B2 | 9/2007 | Bolda et al. |
| 7,528,737 B2 | 5/2009 | Hedtke |
| 7,607,402 B2 | 10/2009 | Petrakis |
| 7,640,883 B2 | 1/2010 | Kugel |
| 7,641,358 B1 | 1/2010 | Smith et al. |
| 7,757,623 B2 | 7/2010 | Manahan |
| 2003/0214816 A1 | 11/2003 | Barlian et al. |
| 2004/0146084 A1 | 7/2004 | Hachtel et al. |
| 2005/0217558 A1 | 10/2005 | Fitzer et al. |
| 2006/0220895 A1 | 10/2006 | Acaria et al. |
| 2007/0241916 A1 | 10/2007 | Hedtke |
| 2009/0158992 A1 | 6/2009 | Manahan |
| 2009/0284381 A1 | 11/2009 | Manahan |
| 2010/0039256 A1 | 2/2010 | Manahan |
| 2010/0043695 A1 | 2/2010 | Reichert |
| 2010/0163765 A1 | 7/2010 | Gregoire |
| 2010/0229784 A1 | 9/2010 | Bayne et al. |
| 2010/0242830 A1 | 9/2010 | Manahan |
| 2010/0275676 A1 | 11/2010 | King et al. |
| 2012/0285365 A1 | 11/2012 | Wangler et al. |

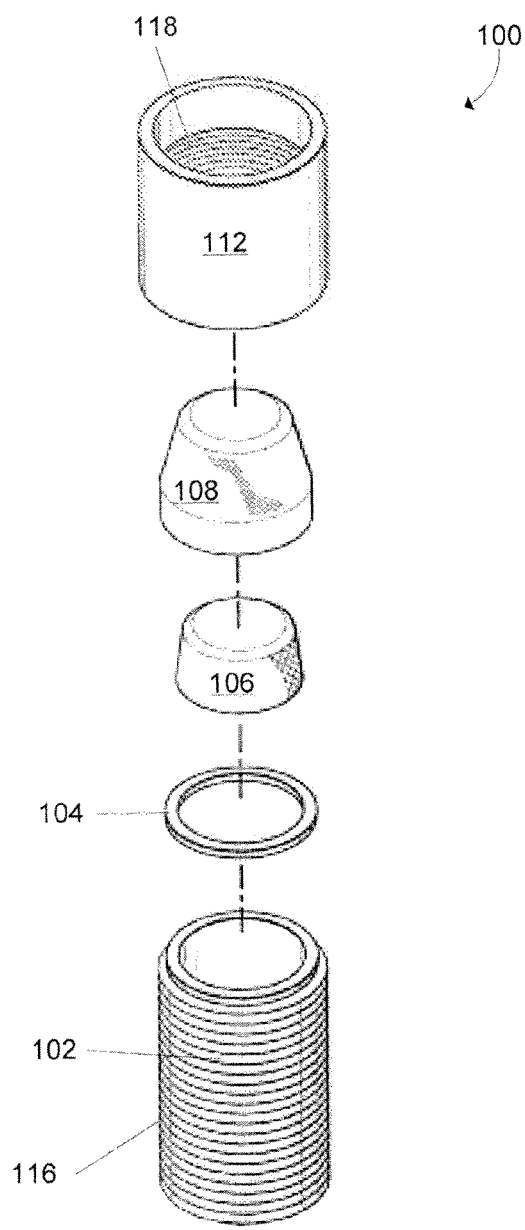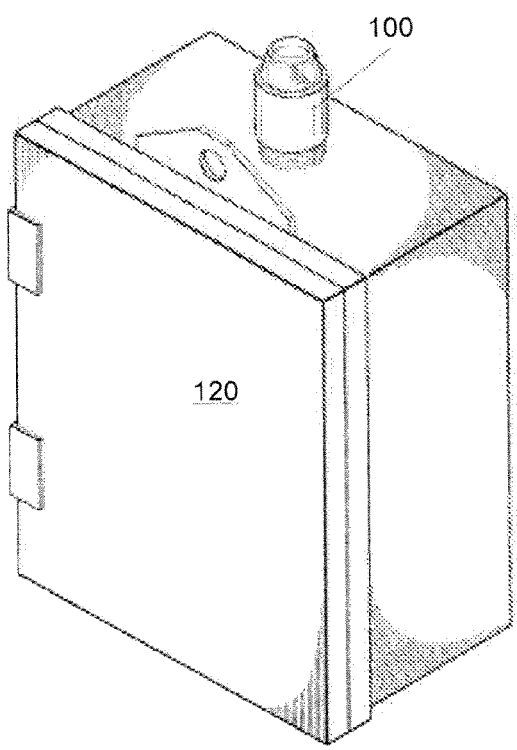
FIGURE 1C
FIGURE 1D

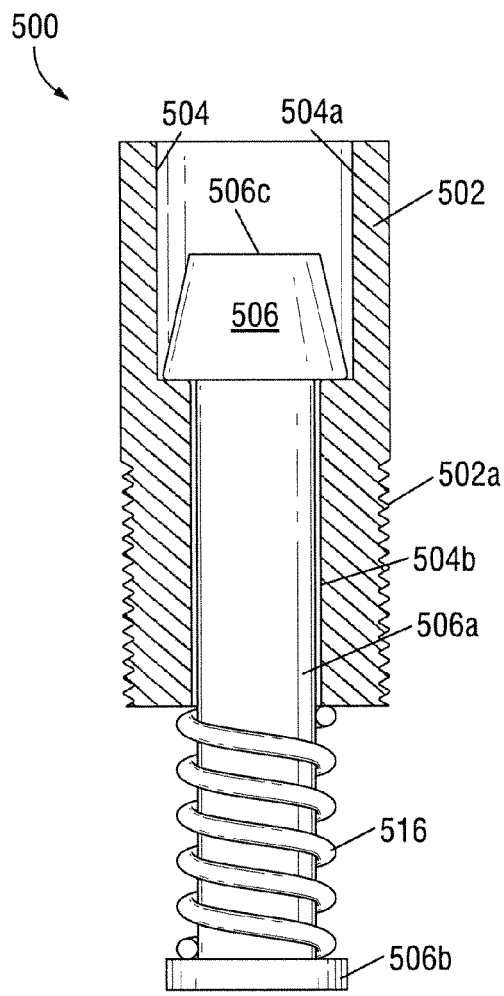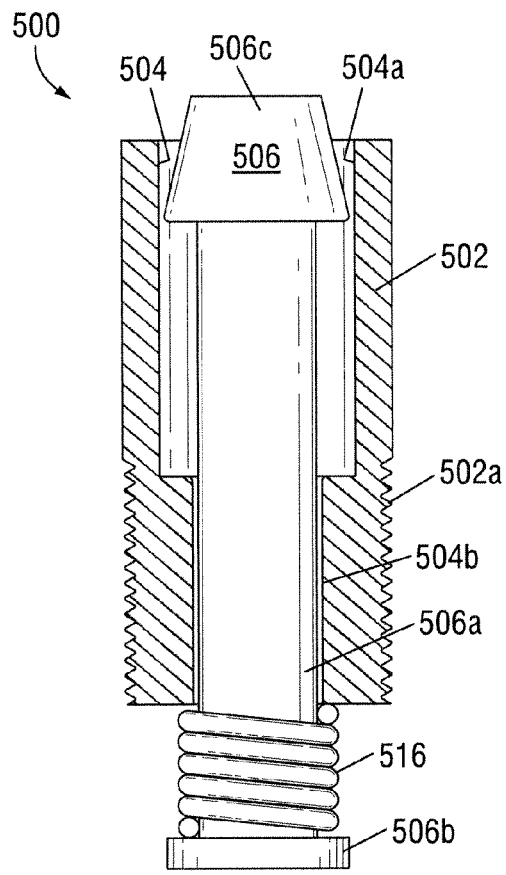
FIGURE 5A
FIGURE 5B

INDICATOR DEVICE FOR AN ENCLOSURE WITH SEALING COMPOUND

CROSS-REFERENCE TO RELATED APPLICATIONS

This application is a continuation application of and claims priority under 35 U.S.C. §120 to U.S. patent application Ser. No. 13/158,115, filed on Jun. 10, 2011, and entitled "Indicating Devices and Associated Methods", which is a continuation-in-part application of U.S. patent application Ser. No. 12/813,114, filed Jun. 10, 2010, and entitled "Explosion Indicators for Use in Explosion-Proof Enclosures with Critical Equipment," which is a divisional application of U.S. patent application Ser. No. 11/960,904, filed Dec. 20, 2007, entitled "Explosion Indicators for Use in Explosion-Proof Enclosures with Critical Equipment". All of the above-mentioned applications are incorporated by reference herein for all purposes.

BACKGROUND OF THE INVENTION

The present application relates to indicator devices for indication of temperature and/or pressure increases. The indicator devices can be used to indicate sealing within an enclosure or conduit, to indicate mechanical engagement of two parts, or be used in other applications requiring general indication of mechanical displacement, temperature and/or pressure changes.

Under some circumstances, enclosed equipment may be damaged when subject to internal explosions, thus rendering the equipment faulty. Currently, there are no devices or methods of alerting a user that an internal explosion has occurred in equipment already equipped to withstand high pressures. As a result, in some instances, the equipment may continue to operate without maintenance under unsafe or faulty conditions and lead to further damage to the internal equipment, as well as damage to any downstream equipment connected to the internal equipment.

In other circumstances, an enclosure, such as a conduit in a hazardous location, may allow flame propagation through the conduit system after an explosion, if the area is not sealed properly. The flame propagation can also result in pressure piling, which can cause another unwanted larger explosion. Currently, there are no devices or methods of indicating that the area has been sealed properly.

Further, proper engagement of an enclosure cover to an enclosure body is necessary for containing any potential explosion therein, as well as seal off the enclosure interior from the exterior environment. Currently, there are no devices or methods of indicating that the enclosure cover is properly coupled to an enclosure body.

SUMMARY OF THE INVENTION

The present invention satisfies the above-described needs by providing an indicator device having a housing and an indicator therein. In one aspect, the housing includes a bore or an opening therein in which the indicator is placed. The indicator is retained in the housing by a latch held in place by a spring. The spring includes a central axis, and the latch is pivotable about the central axis. Upon an increase in temperature or pressure, the restrictive force of the spring is overcome, the latch pivots and releases the indicator, and a portion of the indicator exits the housing.

In another aspect, an indicator device includes a housing and an indicator therein. The housing includes a bore or an opening therein in which the indicator is placed. The bore includes a first portion and a second portion. The indicator includes a shaft having an indicating portion on one end and a ledge or pressure disc on an opposing end of the shaft. The indicating portion is positioned in the first portion and the shaft is positioned substantially in the second portion. Upon an increase in pressure or force against the ledge, the indicator shifts such that the indicating portion at least partially exits the first portion. In some embodiments, a spring is positioned around the shaft between the ledge and the second portion. When the spring is in a normal or extended state, the indicating portion is in the first portion. When the spring is compressed upon a force being applied against the ledge, the indicator device is activated and the indicating portion exits the first portion.

Methods of detecting sealing are also provided. Methods generally include isolating an area of an enclosure or conduit to be sealed, positioning an indicator device of the present invention in an opening in the enclosure, and placing an expanding sealing compound in the area of the enclosure to be sealed.

The features of the present invention will be readily apparent to those skilled in the art upon a reading of the description of the preferred embodiments that follow.

BRIEF DESCRIPTION OF THE DRAWINGS

The present invention may be better understood by reading the following description of non-limiting embodiments with reference to the attached drawings wherein like parts of each of the several figures are identified by the same referenced characters, and which are briefly described as follows.

FIG. 1C is a perspective view of the elements of the explosion indicator device of FIG. 1A.

FIG. 1D is a perspective view of the explosion indicator device of FIG. 1A mounted to an explosion-proof enclosure containing critical equipment.

FIG. 5A is a side cross-sectional view of an indicator device before activation.

FIG. 5B is a side cross-sectional view of the indicator device of FIG. 5A after activation.

Figure 1A:
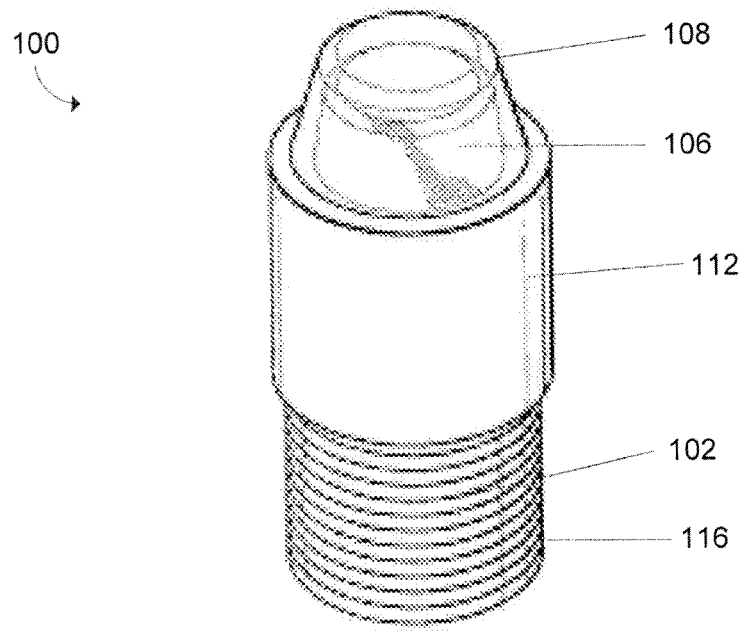
FIG. 1A is a perspective view of an embodiment of an explosion indicator device.
Figure 1B:
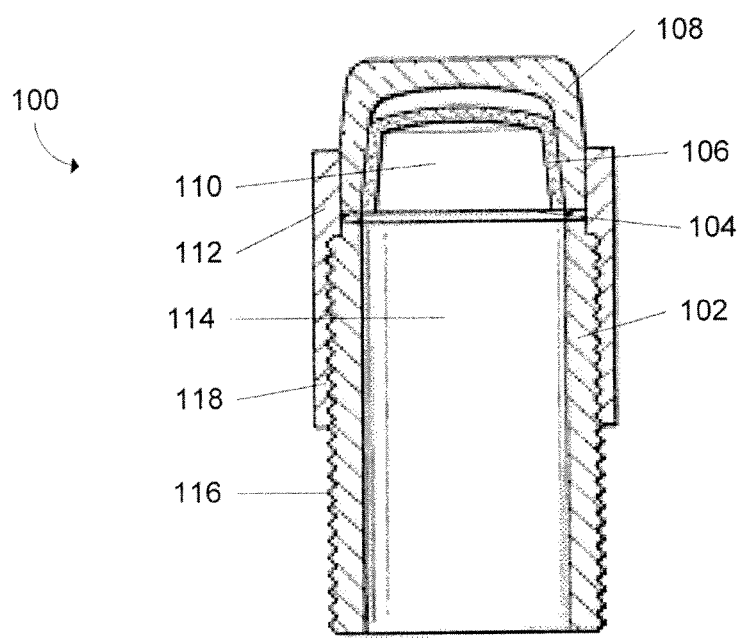
FIG. 1B is a sectional view of the explosion indicator device of FIG. 1A.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

The present application relates to indicator devices. More particularly, the present application relates to explosion indicator devices for use with explosion-proof enclosures containing critical equipment. The indicator devices of the present invention are of simple construction and assembled from easily replaceable parts, therefore possibly minimizing costs of servicing damaged or used devices.

Referring to FIGS. 1A-1D, an exemplary embodiment of an indicator device 100 includes a sleeve 102, a gasket 104, a fiber insert 106, a glass jewel 108 having a cavity 110, and a connector body 112. Sleeve 102 is open at each end and includes a bore 114 therein. Cavity 110 and bore 114 are in communication so as to create a chamber within which the fiber insert 106 is positioned. Sleeve 102 includes exterior threads 116 which threadably engage with connector body 112 having interior threads 118 and an enclosure 120 having interior threads (not shown).

Figure 2A:
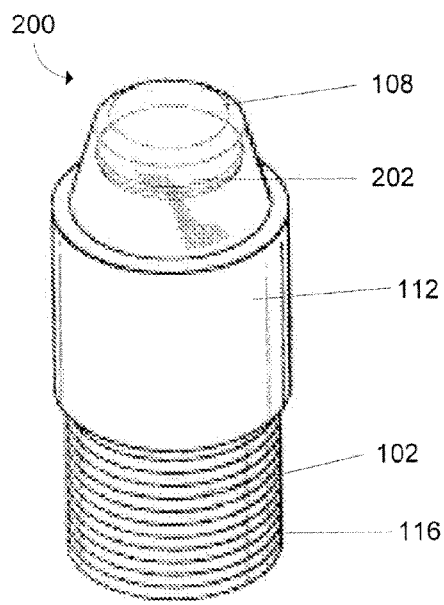
FIG. 2A is a perspective view of an embodiment of an explosion indicator device.
Figure 2B:
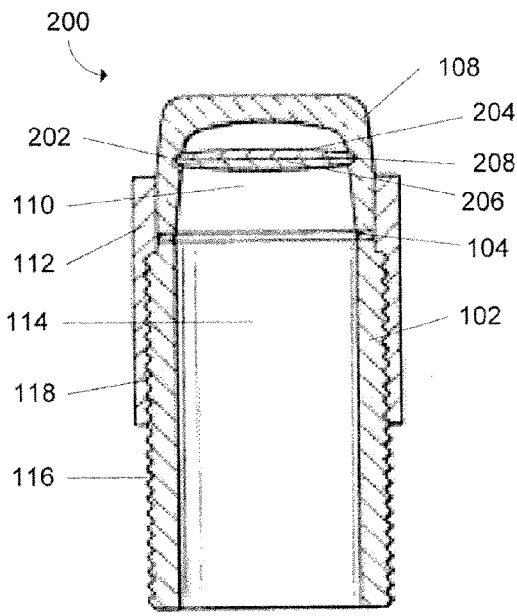
FIG. 2B is a sectional view of the explosion indicator device of FIG. 2A before activation.
Figure 2C:
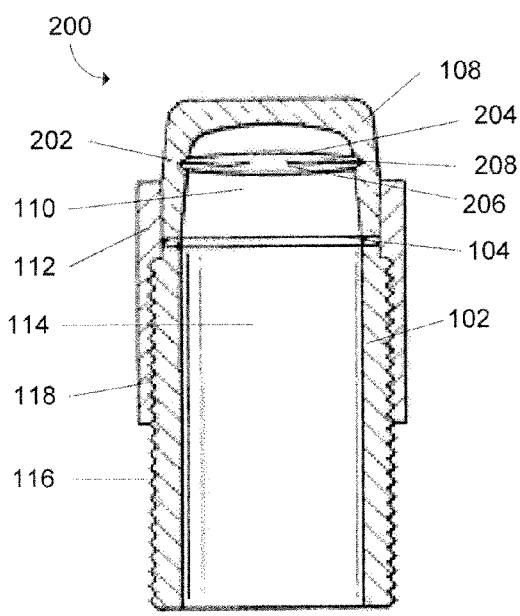
FIG. 2C is a sectional view of the explosion indicator device of FIG. 2A after activation.

Referring to FIGS. 2A-2C, an exemplary embodiment of an indicator device 200 includes a sleeve 102, a gasket 104, a capsule 202 having a first compartment 204 and a second compartment 206 separated by a partition 208, a glass jewel 108 having a cavity 110, and a connector body 112. Sleeve 102 is open at each end and includes a bore 114 therein. Cavity 110 and bore 114 are in communication so as to create a chamber within which the capsule 202 is positioned. Sleeve 102 includes exterior threads 116 which threadably engage with connector body 112 having interior threads 118 and an enclosure (not shown) similar to that in FIG. 1D. As shown in FIG. 2C, when the capsule 202 is activated, the partition 208 reacts so as to allow the contents of first compartment 204 and contents of second compartment 206 to mix.

Figure 3A:
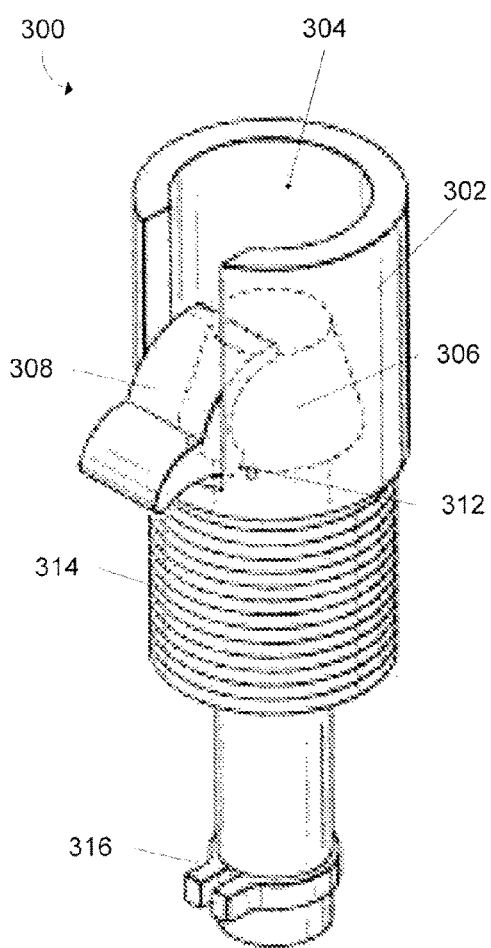
FIG. 3A is a perspective view of an embodiment of an explosion indicator device before activation.
Figure 3B:
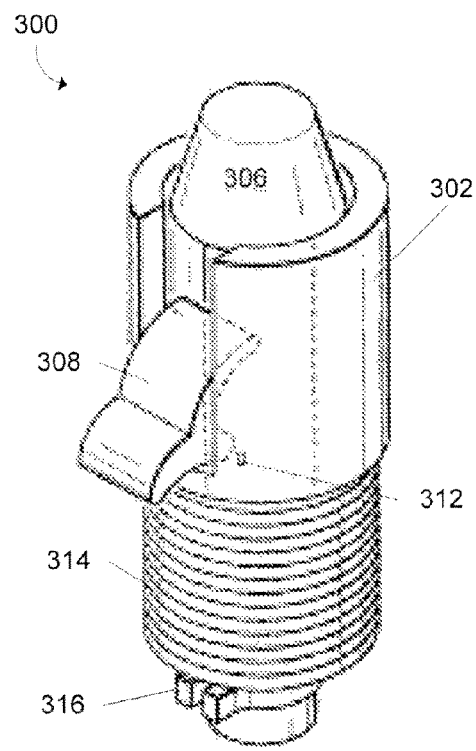
FIG. 3B is a perspective view of the explosion indicator device of FIG. 3A after activation.
Figure 3C:
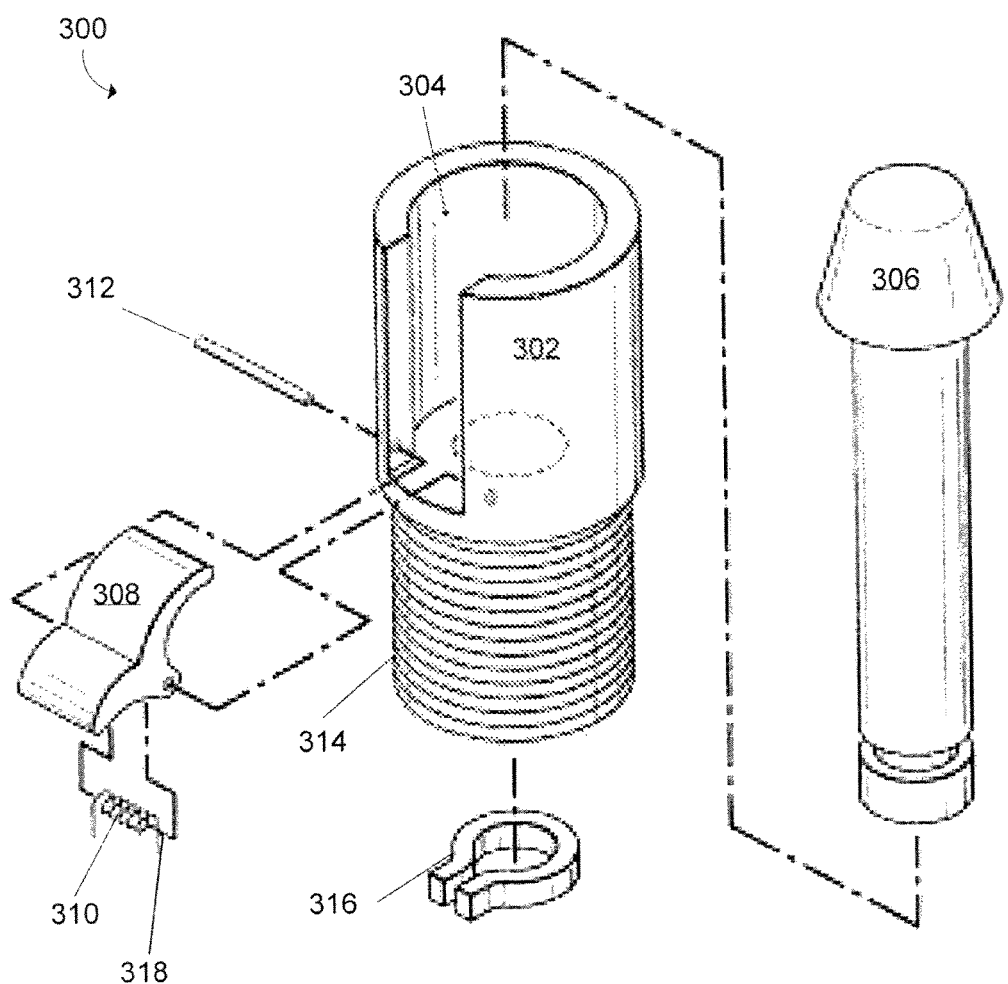
FIG. 3C is a perspective view of the elements of the explosion indicator device of FIG. 3A.
Figure 3D:
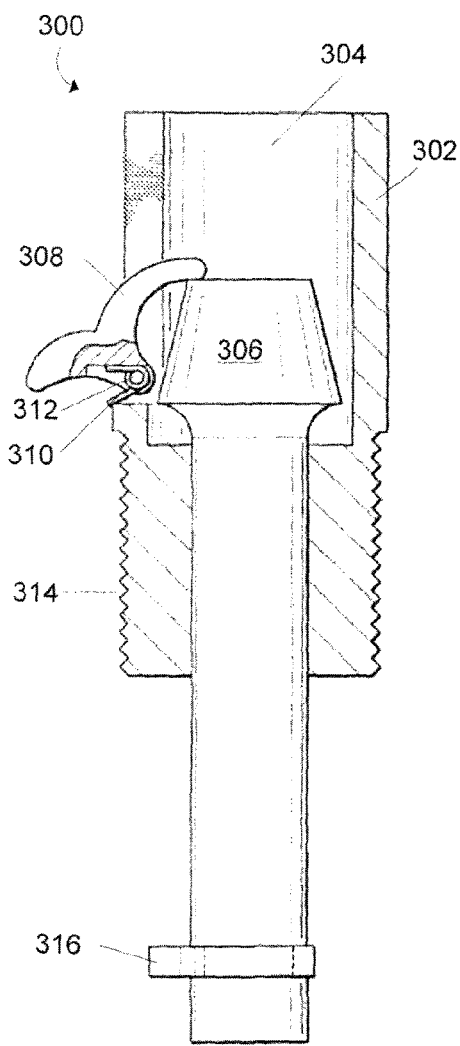
FIG. 3D is a sectional view of the explosion indicator device of FIG. 3A before activation.
Figure 3E:
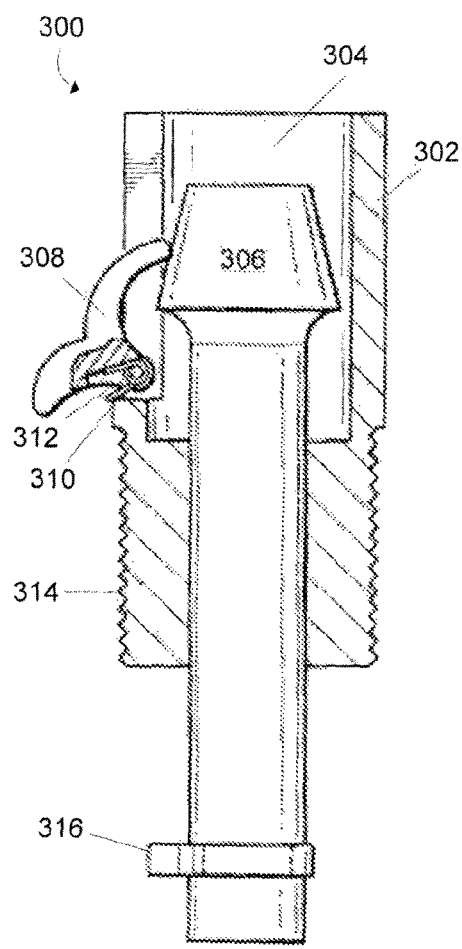
FIG. 3E is a sectional view of the explosion indicator device of FIG. 3A as the device is being activated.
Figure 3F:
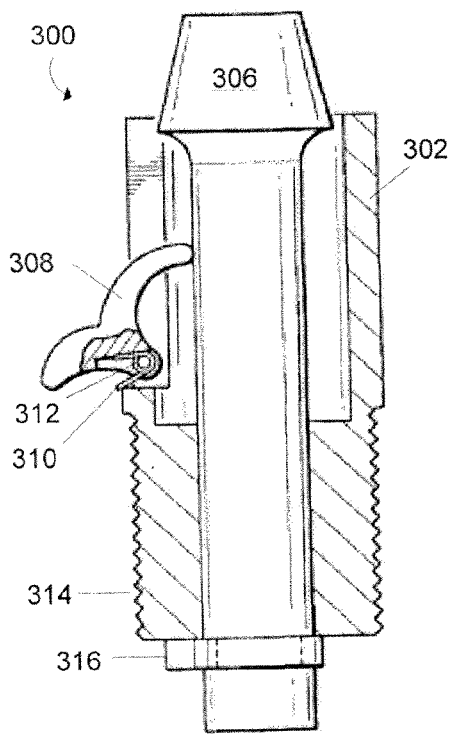
FIG. 3F is a sectional view of the explosion indicator device of FIG. 3A after activation.
Figure 3G:
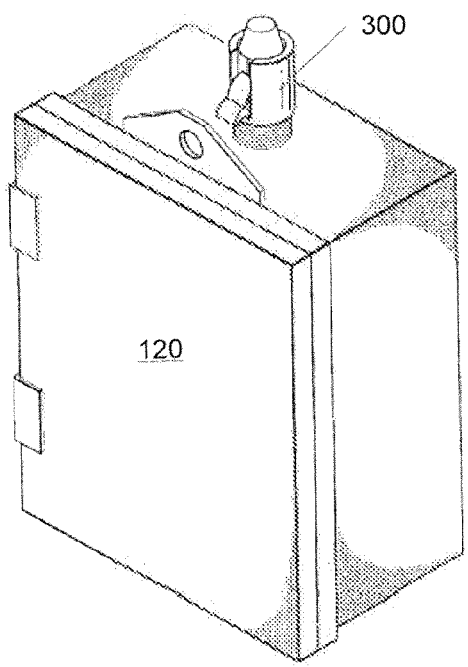
FIG. 3G is a perspective view of the explosion indicator device of FIG. 3A mounted to an explosion-proof enclosure containing critical equipment.

Referring to FIGS. 3A-3G, an exemplary embodiment of an indicator device 300 includes a sleeve 302 open at each end and having an opening in a portion of the sleeve wall, and having a bore 304 therein, and a brightly colored component 306 retained in sleeve 302 by a latch 308 held in place by a pivot spring 310 and pin 312. The pivot spring 310 includes a central axis 318 (FIG. 3C) extending through a center of and along a length of the pivot spring 310. Sleeve 302 includes exterior threads 314 which threadably engages with enclosure 120 having interior threads (not shown). When the pressure differential is greater than the restrictive force of the pivot spring 310, the latch 308 pivots about the central axis 318 from a first position (FIG. 3D) to a second position (FIG. 3E). The indicator device 300 is activated and at least a portion of the brightly colored component 306 exits the top portion of sleeve 302, as indicated by FIGS. 3B and 3F, and retaining ring 316 prevents brightly colored component 306 from completely exiting the sleeve 302.

Figure 4:
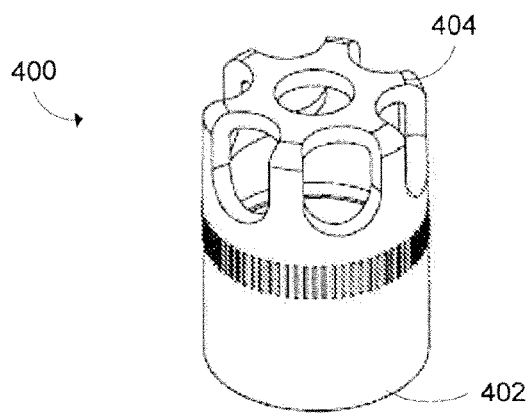
FIG. 4 is a perspective view of a guard unit.

Referring to FIG. 4, an exemplary embodiment of a guard unit 400 that may be used to replace connector body 112 in indicator devices 100 and 200. Guard unit 400 is open at one end 402 and at least partially open at a second end 404, and includes a bore therein. Guard unit 400 includes interior threads (not shown) for threadably engaging a sleeve 102 of indicator devices 100 and 200. Second end 404 protects glass jewel 108, while allowing a user at least partial visual sight of glass jewel 108.

Generally, the indicator devices of the present invention include a sleeve open at each end and having a bore therein, a dome-like transparent member having a cavity, a connector body, and an indicator. The transparent member is coupled to the sleeve by the connector body such that the cavity is in communication with the bore and thereby creating a chamber, and the indicator is positioned within the chamber. In some embodiments, the indicator device may further include a gasket, seal, or other sealing device positioned between the sleeve and the transparent member. The materials of construction for the indicator devices of the present invention is dependent on a variety of factors, such as the operating temperature and pressure, the particular application, equipment conditions, and the like, which will be recognizable by a person skilled in the art.

The sleeve of the indicator devices of the present invention may be made of any material that can withstand the presence of flammable vapors, gases, or highly combustible dusts. Suitable examples of sleeve material include, but are not limited to, brass, stainless steel, aluminum, or plastics appropriate for hazardous applications. The sleeve construction should provide integrity to the indicator device. For example, a threaded portion may be included in the sleeve to provide a flame-resistant exit path in the case of an explosion.

Suitable examples of the dome-like transparent member include, but are not limited to, glass jewels, transparent plastic materials, or other means of visualizing an indicator. In some embodiments, the dome-like transparent member may be clear. In some embodiments, the dome-like transparent member may be colored so as to enhance visually any light emitted by the indicator within.

The connector body of the indicator devices of the present invention may be made of any material that can withstand the presence of flammable vapors, gases, or highly combustible dusts. Suitable examples of connector body material include, but are not limited to, those suitable for environmental exposure. The connector body is a mechanical means to connect the transparent member to the sleeve. The connector body may also provide an explosion proof joint between the transparent member and connector body via a flat flamepath, and/or an explosion proof joint within the body via a threaded flamepath. Furthermore, the connector body may be a guard unit for protecting the dome-like transparent member to achieve higher impact standards.

The indicators of the present invention are activated in response to a temperature differential, pressure differential, or both. In some embodiments, the indicator may include a material that changes color in response to a temperature differential and/or pressure differential. The material may be in the form of an insert that is placed in a cavity of the indicator devices of the present invention. In some embodiments, the material may include fibers, high temperature plastics, or pressure sensitive films that discolor in response to a temperature differential and/or pressure differential. Suitable examples of these materials include, but are not limited to, flame retardant material, brightly colored material, and combinations thereof. Examples of suitable pressure sensitive films include, but are not limited to, those described in U.S. Pat. No. 6,442,316. In some embodiments, the materials may be enclosed in a highly flammable material, such as kapok fibers. Other materials and configurations for the insert will also be apparent to those of ordinary skill in the art and are considered to be within the scope of the present invention.

In some embodiments, the indicator may be in the form of a capsule having a first compartment and a second compartment separated by a partition that reacts to a temperature and/or pressure differential. In some embodiments, the indicator may have more than two compartments separated by partitions that react to a temperature and/or pressure differential. The partition may be an elastic membrane having a cross-section designed to fail under a desired circumstance, or may be a thin glass partition capable of fracturing under pressure. Other configurations for the partition will also be apparent to those of ordinary skill in the art and are considered to be within the scope of the present invention. The compartments may be equal in size, or of different sizes. The first compartment may include a first chemical and the second compartment may include a second chemical, wherein light is emitted when the first and second chemicals are mixed after the partition reacts. Suitable examples of the first chemical include, but are not limited to, luminols, oxalates, derivatives and salts thereof, and combinations thereof. Examples of suitable oxalates include, but are not limited to, bis(2,4,5-trichlorophenyl-6-carbopentoxyphenyl) oxalate. Suitable examples of the second chemical include, but are not limited to, oxidants. In some embodiments, a fluorophore may be further added to the first chemical and/or second chemical. Suitable examples of fluorophores include, but are not limited to, 2,4-di-tert-butylphenyl 1,4,5,8-tetracarboxynaphthalene diamide (for red color) and 5,12-bis(phenylethynyl)naphthacene (for orange color). Other fluorophores will be apparent to those of ordinary skill in the art and are considered to be within the scope of the present invention.

In some embodiments, the indicator devices of the present invention may include a sleeve open at each end and having a bore formed therein and an indicator placed in the bore. The indicator is retained in the sleeve by a latch held in place by a spring and a retaining ring. Suitable examples of springs include, but are not limited to, pivot springs or living hinge springs. The spring may be constructed of any material that will not likely oxidize and impede performance of the device. In some embodiments, the spring may be constructed from stainless steel. In some embodiments, the indicator may be a brightly-colored component. When a temperature differential or pressure differential is greater than the restrictive force of the spring, the indicator device is activated and at least a portion of the indicator exits the sleeve.

In some embodiments, methods associated with indicator devices of the present invention include methods of providing a system for detecting a high stress event, including providing an enclosure coupled to an indicator device having a sleeve open at each end and having a bore therein, a dome-like transparent member having a cavity, a connector body, and an indicator, wherein the indicator is adapted to activate upon exposure to a temperature differential, pressure differential, or both. The transparent member is coupled to the sleeve by the connector body such that the cavity is in communication with the bore and thereby creating a chamber, and the indicator is positioned within the chamber. In some embodiments, activating the indicator comprises the indicator changing color. In other embodiments, the indicator is a capsule having a first compartment having a first chemical and a second compartment having a second chemical separated by a partition, and activating the indicator comprises the partition reacting so as to allow the first and second chemicals to mix so as to emit light.

In some embodiments, methods associated with indicator devices of the present invention include methods of providing a system for detecting a high stress event, including providing an enclosure coupled to an indicator device having a sleeve open at each end and having a bore formed therein, and an indicator placed in the bore and retained in the sleeve by a latch held in place by a spring and a retaining ring, wherein the indicator is adapted to activate upon exposure to a temperature differential, pressure differential, or both. In some embodiments, the indicator is a brightly-colored component. In some embodiments, activating the indicator includes at least a portion of the indicator exiting the sleeve when a temperature differential or pressure differential is greater than the restrictive force of the pivot spring.

Generally, systems of the present invention comprise an indicator device of the present invention coupled to an enclosure. The indicator devices of the present invention may have features that allow it to be easily coupled to an enclosure comprising equipment. For example, the sleeve may include outer threads adapted for threading engagement with complimentary threads formed in the interior of the enclosure wall. In another example, the indicator devices may include a highly machined flat surface that may be bolted or secured to a highly machined flat surface of an enclosure.

Figure 6A:
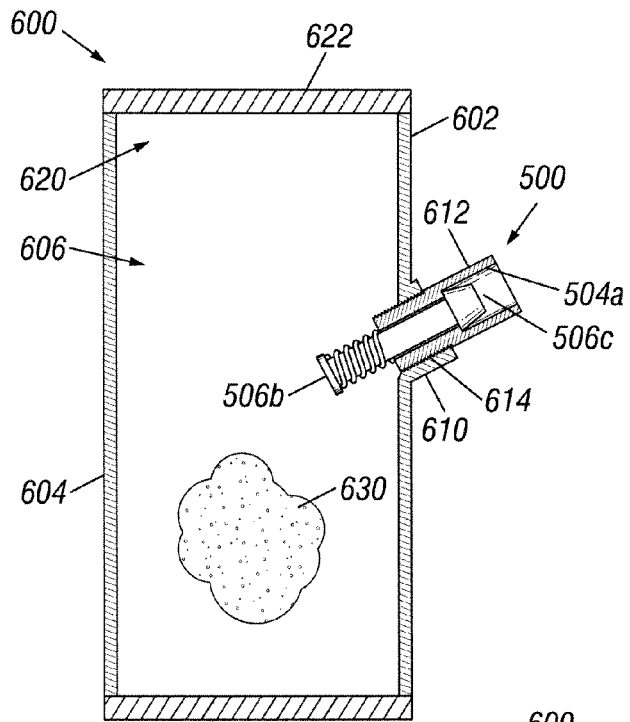
FIG. 6A is a side cross-sectional view of the indicator device of FIG. 5A coupled to a conduit system before activation.
Figure 6B:
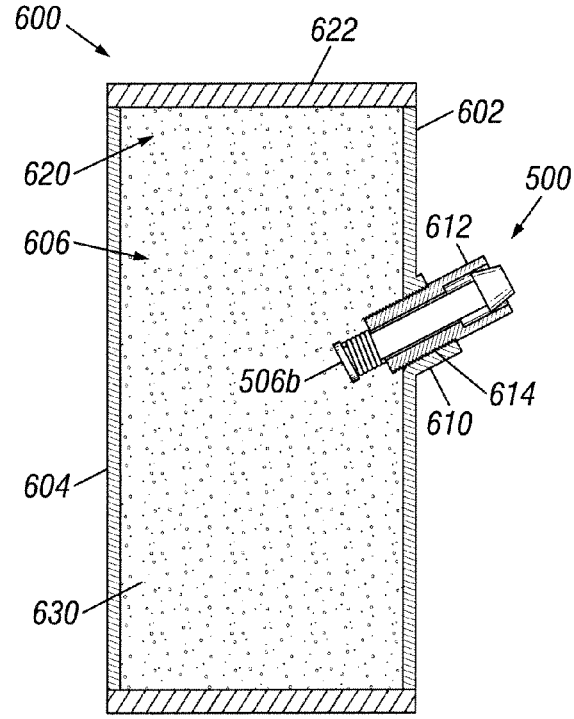
FIG. 6B is a side cross-sectional view of the indicator device of FIG. 5A coupled to a conduit system of FIG. 6A after activation.

Referring now to FIGS. 5A-5B, an exemplary embodiment of an indicator device 500 for use in sealing applications is shown. The indicator device 500 includes an indicator housing or sleeve 502 having a cylindrical opening or bore 504 extending therethrough. In certain exemplary embodiments, the sleeve 502 acts as a plug or sealing member when positioned within an opening or plug cavity 612 in a conduit 602 (FIGS. 6A-6B). In certain exemplary embodiments, the sleeve 502 includes threads 502a for mating with corresponding threads 614 in the conduit 602. In certain exemplary embodiments, the bore 504 includes a first portion 504a and a second portion 504b. The first portion 504a has a size, or diameter, that is larger than a size, or diameter, of the second portion 504b.

A brightly colored component 506 is positioned within the bore 504 of the sleeve 502. The component 506 includes a cylindrical shaft 506a having a ledge or flat pressure disc 506b coupled to one end of the shaft 506a and an indicating portion 506c coupled to the other end of the shaft 506a. The shaft 506a is generally configured to be positioned within the second portion 504b and movable therein. In certain exemplary embodiments, the size and shape of a cross-section of the shaft 506a corresponds to the size and shape of the second portion 504b of the bore 504. In certain exemplary embodiments, the size, or diameter, of the disc 506b is greater than the size of the second portion 504b of the bore 504 and the size of the shaft 506a.

The indicating portion 506c is generally configured to be positioned within the first portion 504a of the bore 504 in the normal state (FIG. 5A), and at least partially exits the first portion 504a in the actuated or activated state (FIG. 5B). In certain exemplary embodiments, the size of the indicating portion 506c is greater than the size of the second portion 504b of the bore 504 and the size of the shaft 506a. Generally, the disc 506b and the indicating portion 506c prevent the component 506 from completely exiting the second portion 504b of the bore 504. In certain exemplary embodiments, a compressible member, such as a spring 516, is positioned around an end of the shaft 506a between the disc 506b and the sleeve 502. In alternative embodiments, a breakable member can be positioned between the disc 506b and the sleeve 502 that readily fractures upon a force being applied to the disc 506b. In certain exemplary embodiments, the compressible member or the breakable member offers minimal resistance to a force being applied to the disc 506b.

When the spring 516 is in the extended or normal state (FIG. 5A), the indicating portion 506c is positioned entirely within the first portion 504a of the bore 504. When a sufficient force is applied to the disc 506b, the spring 516 is compressed (FIG. 5B), thus causing at least a portion of the indicating portion 506c to move out of the first portion 504a of the bore 504 and indicate that the indicator device 500 has been activated.

Referring now to FIGS. 6A and 6B, an exemplary embodiment of a conduit system 600 is shown. The system 600 includes a conduit 602 having a generally cylindrical wall 604 defining a central cavity 606 therein. The conduit 602 also includes an extension 610 integrally coupled to the wall 604 and defining a plug cavity 612 therein. The plug cavity 612 and the central cavity 606 are open to one another, and a path exists from the central cavity 606 to the plug cavity 612. The indicator device 500 is positioned within the plug cavity 612 of the extension 610. In certain exemplary embodiments, the interior of the extension 610 includes threads 614 for mating with threads 502a of the sleeve 502 of the indicator device 500.

In certain exemplary embodiments, it is desirable to seal the interior of the conduit 602, for example, in instances where a housing with sparking or arcing part or hot operating devices that could cause an ignition would need to be sealed off, where the conduit 602 goes from one level of hazard to another or from one room to another. An area 620 to be sealed in the central cavity 606 of the conduit 602 can be isolated using dams 622, 624. In certain exemplary embodiments, the dams 622, 624 are constructed from neoprene, fiber materials, putty compounds, and the like. An expanding sealing element 630 can be placed in the area 620 (FIG. 6A) and allowed to expand to fill the area 620. Suitable examples of sealing elements 630 include, but are not limited to, Chico® SpeedSeal™ Compound, commercially available from Cooper Crouse-Hinds, and epoxy-based sealants. As the sealing element 630 expands, the sealing element 630 forces against the disc 506b, thereby causing at least part of the indicating portion 506c to shift out of the first portion 504a and actuating the indicator device 500 (FIG. 6B) to indicate that the area 620 has been filled and sealed.

Figure 7:
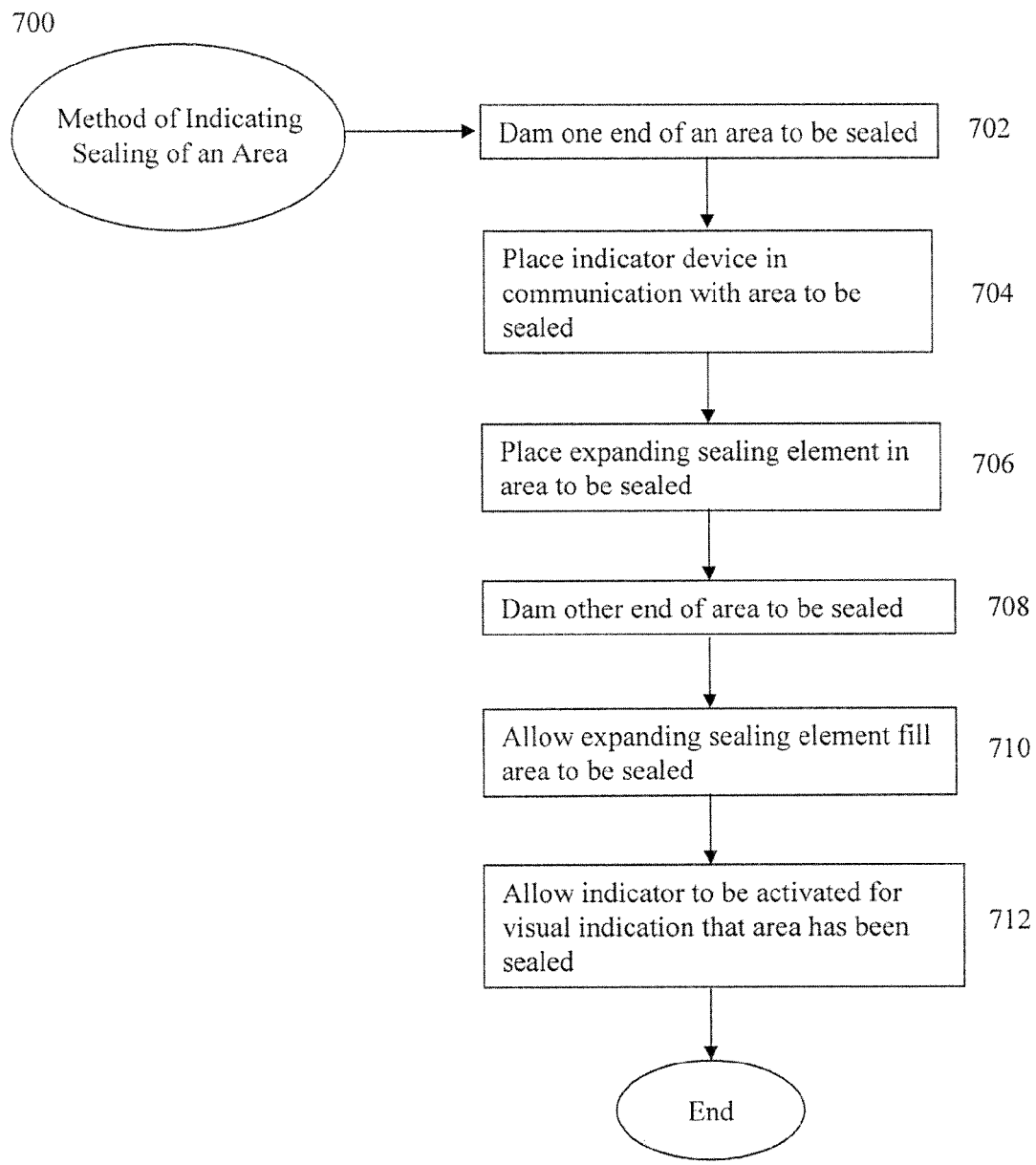
FIG. 7 illustrates a method of indicating that sealing of the conduit system of FIG. 6A has occurred.

Referring to FIG. 7, an exemplary method 700 of determining if an area of an enclosure or conduit has been sealed is shown. In step 702, one end of the area to be sealed is dammed. In step 704, an indicator device is positioned in an opening that is in physical communication with the area to be sealed. In step 706, an expanding sealing element is placed within the area to be sealed. In step 708, the other end of the area to be sealed is dammed. In step 710, the sealing element expands and fills the area to be sealed. In step 712, the indicator device is actuated, thereby indicating that the area has been filled.

Figure 8A:
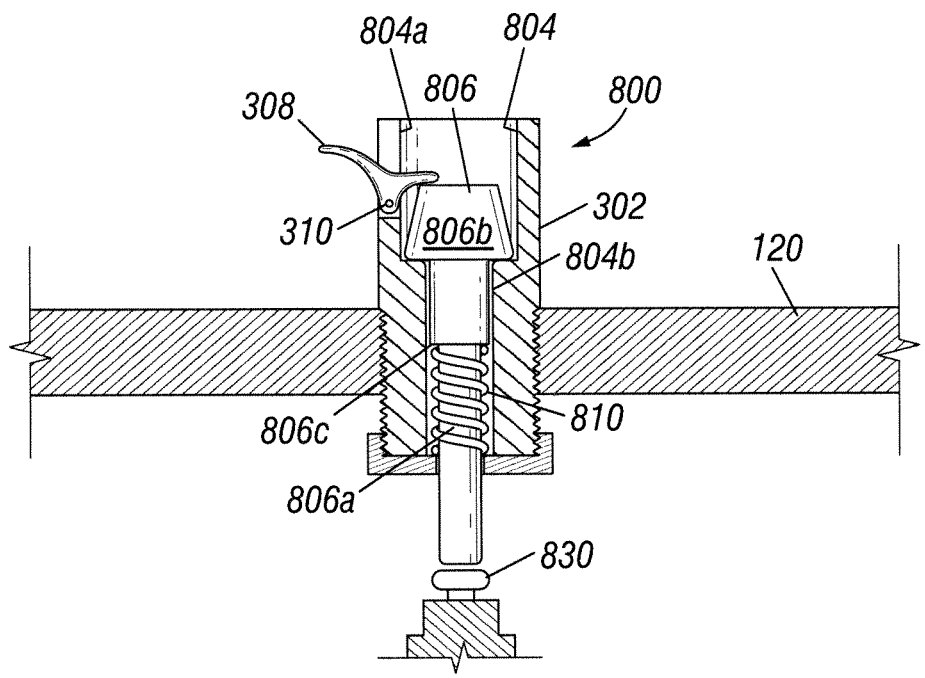
FIG. 8A is a side cross-sectional view of another indicator device coupled to an enclosure.
Figure 8B:
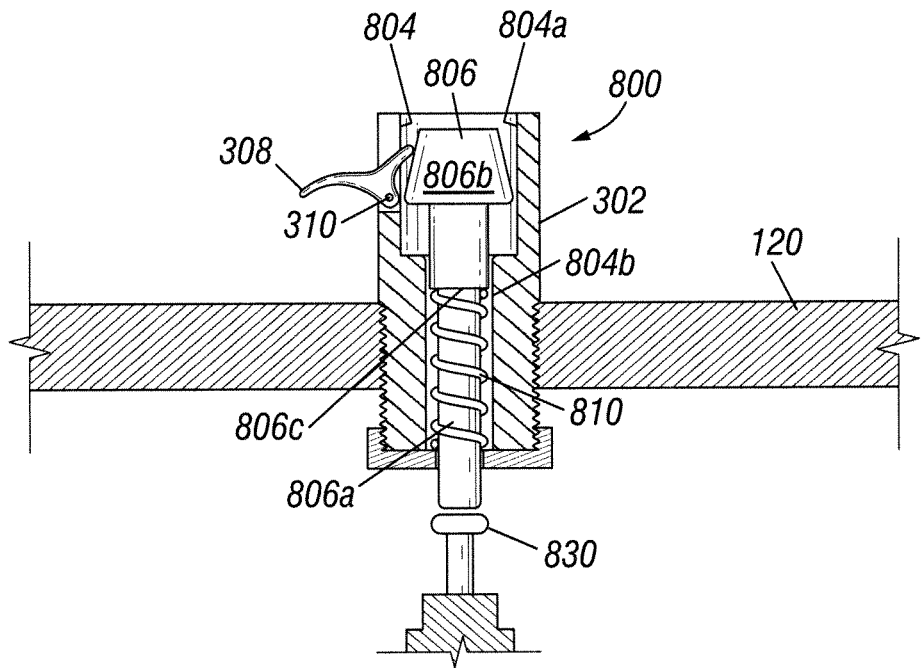
FIG. 8B is a side cross-sectional view of the indicator device of FIG. 8A coupled to the enclosure.

Referring to FIGS. 8A-8B, an exemplary embodiment of an indicator device 800 coupled to the enclosure 120 is shown. The indicator device 800 is the same as that described above with regard to indicator device 300, except as specifically stated below. For the sake of brevity, the similarities will not be repeated hereinbelow. A bimetal spring 810 is positioned around a shaft 806a of a brightly colored component 806 on an end opposing a portion 806b that exits the housing or sleeve 302 when activated. Upon an increase in temperature, the bimetal spring 810 expands and pushes against a ledge 806c on the shaft 806a so as to overcome the restrictive force of the pivot spring 310. The latch 308 pivots about its central axis and the indicator device 800 is activated when at least a portion of the brightly colored component 806 exits the top portion of sleeve 302. In certain exemplary embodiments, the length of the bi-metal spring 810 varies based on the temperature range to be indicated, for instance, a shorter bi-metal spring that needs to expand more may be used to indicate a higher temperature versus a longer bi-metal spring that needs to expand less may be used to indicate lower temperatures. In certain exemplary embodiments, sleeve 302 includes a bore 804 having a cylindrical first portion 804a and a cylindrical second portion 804b, where the first portion 804a has a diameter greater than a diameter of the second portion 804b. The portion 806b of the brightly colored component 806 is positioned within the first portion 804a, and has a size greater than the diameter of the second portion 804b.

In certain exemplary embodiments, the shaft 806a is in physical communication with a switch 830 that is in electrical communication with an alarm or power system (not shown). Prior to activation of the indicator device 800, the switch 830 is depressed, thereby indicating that the system is in the normal state (FIG. 8A). Once the brightly colored component 806 shifts in response to a temperature increase, the shaft 806a disengages the switch 830 (FIG. 8B), thereby sending a signal that the indicator device has been activated. In certain exemplary embodiments, when the switch 830 opens, power to the system is shut off. In certain exemplary embodiments, the switch 830 is an explosion-proof switch. In certain exemplary embodiments, the switch 830 is a pushbutton switch. In certain exemplary embodiments, the indication system is resettable after activation.

Figure 9A:
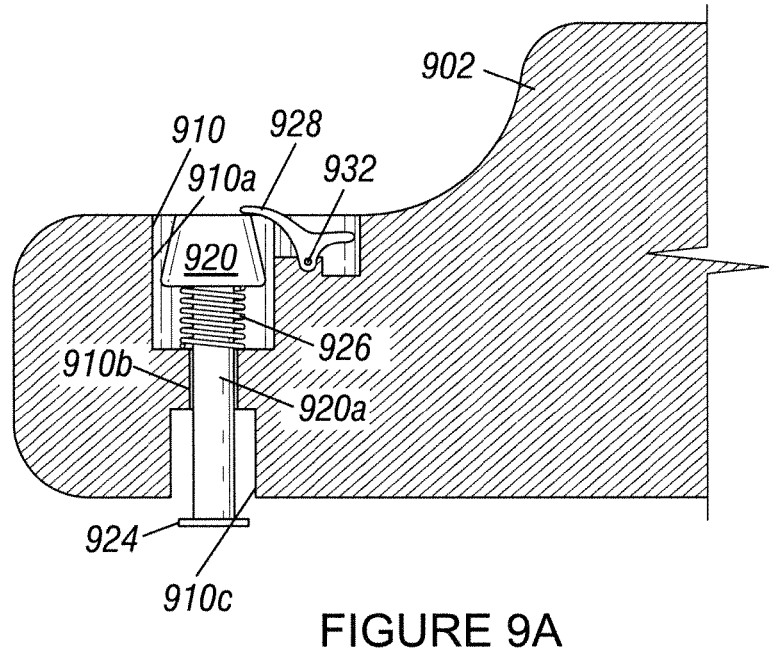
FIG. 9A is a side cross-sectional view of an enclosure cover having an indication system before activation.
Figure 9B:
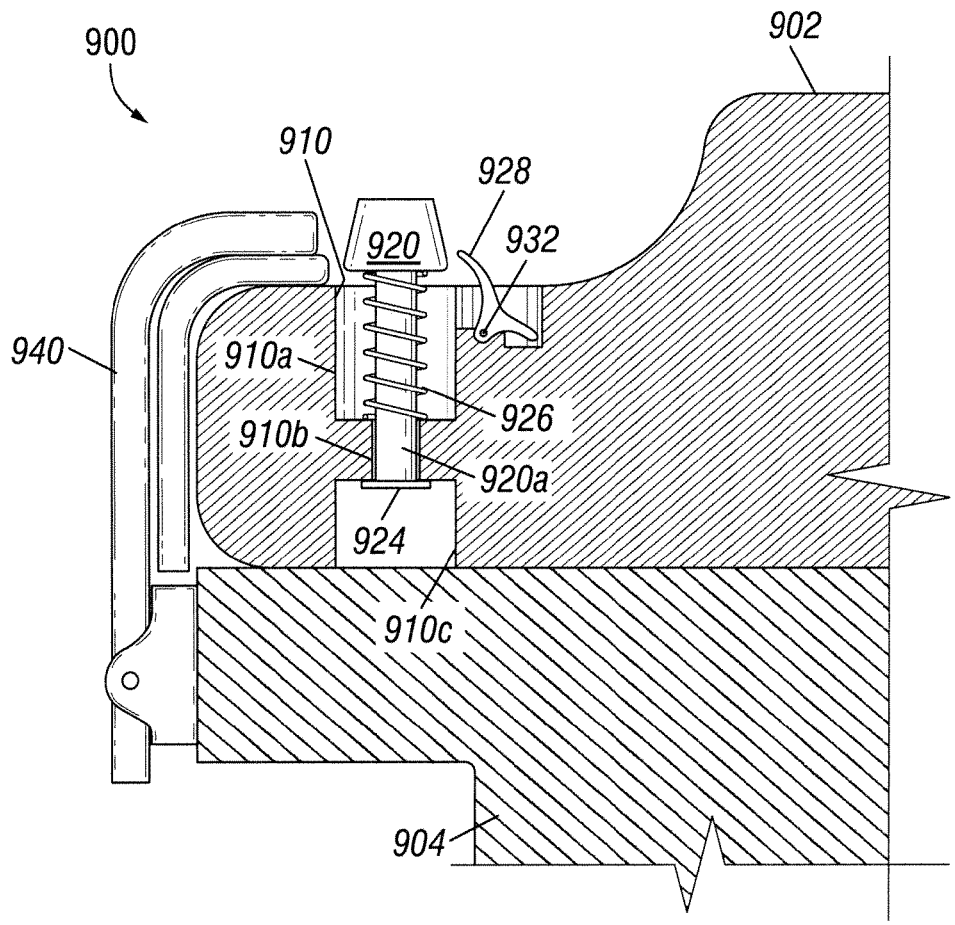
FIG. 9B is a side cross-sectional view of an enclosure system having the enclosure cover of FIG. 9A coupled to an enclosure body after activation of the indication system.

Referring to FIGS. 9A-9B, an exemplary embodiment of an enclosure system 900 is illustrated. The system 900 includes a housing or enclosure cover 902 and an enclosure body 904. The enclosure cover 902 includes an opening 910 having a cylindrical first portion 910a, a cylindrical second portion 910b that has a diameter less than the first portion 910a, and a cylindrical third portion 910c that has a diameter greater than the second portion 910b. A brightly colored indicating component 920 having a cylindrical shaft 920a and an indicating portion 920b is positioned in the opening 910. The indicating portion 920b is sized to be received in the first portion 910a. In certain exemplary embodiments, a disc 924 is positioned at the base of the shaft 920a an movable within and out of the third portion 910c. In certain exemplary embodiments, a spring 926 is positioned around the shaft 920a in the first portion 910a. In certain exemplary embodiments, the diameter of the spring 926 is greater than the diameter of the second portion 910b.

The indicating component 920 is retained in a compressed position in the enclosure cover 902 by a latch 928 held in place by a pivot spring (not shown) and a pin 932. The pivot spring includes a central axis extending through a center of and along a length of the pivot spring. When the enclosure cover 902 is coupled to the enclosure body 904, the enclosure body 904 applies a force against the disc 924 to cause a deflection. In certain exemplary embodiments, a deflection of about 0.003 inch of the disc 924 will activate the system. The deflection also translates the pressure to the spring 926 which results in a force against the latch 928 that is greater than the restrictive force of the pivot spring. The latch 928 pivots about the central axis and allows at least a portion of the brightly colored indicating component 920 to exit the top portion of the enclosure cover 902. In certain exemplary embodiments, a clamping mechanism 940 can be used to secure the enclosure cover 902 to the enclosure body 904. In certain exemplary embodiments, the clamping mechanism 940 provides the necessary deflection to activate the indication system.

Figure 10A:
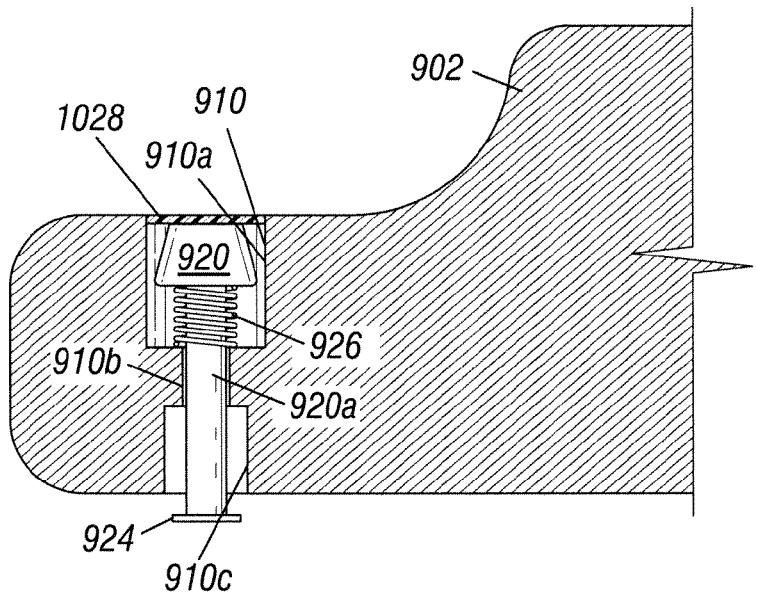
FIG. 10A is a side cross-sectional view of another enclosure cover having an indication system before activation.
Figure 10B:
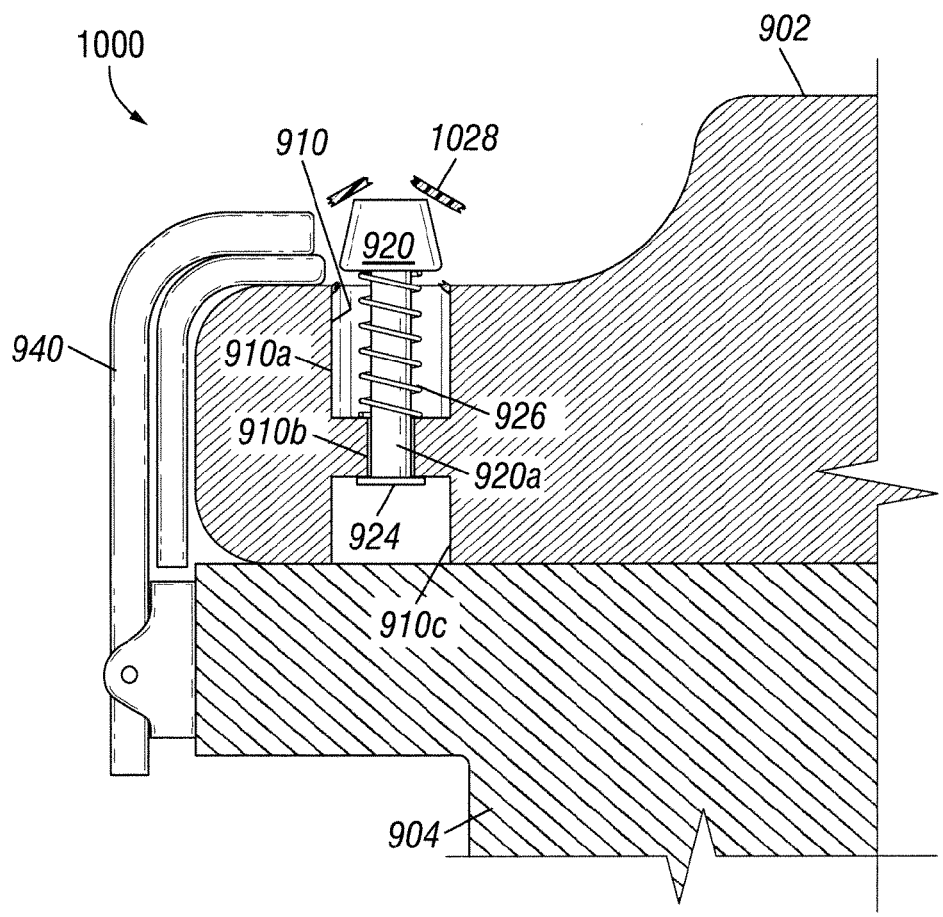
FIG. 10B is a side cross-sectional view of an enclosure system having the enclosure cover of FIG. 10A coupled to an enclosure body after activation of the indication system.

Referring to FIGS. 10A-10B, an exemplary embodiment of an enclosure system 1000 is illustrated. The enclosure system 1000 is the same as that described above with regard to enclosure system 900, except as specifically stated below. For the sake of brevity, the similarities will not be repeated hereinbelow. The latch 928 and pivot spring mechanism of enclosure system 900 is replaced with a breakable membrane 1028 to hold the indicating component 920 in place. The membrane 1028 is positioned adjacent to and above the indicating portion 920b, thus preventing the indicating portion 920b from exiting the first portion 910a. In certain exemplary embodiments, the membrane 1028 is a thin plastic film or a neoprene cover. In certain exemplary embodiments, the membrane 1028 is secured to the enclosure cover 902 with the use of an adhesive, such as glue, a snap-fit connection, a retaining clip, or can be over-molded to the enclosure cover 902.

Figure 11A:
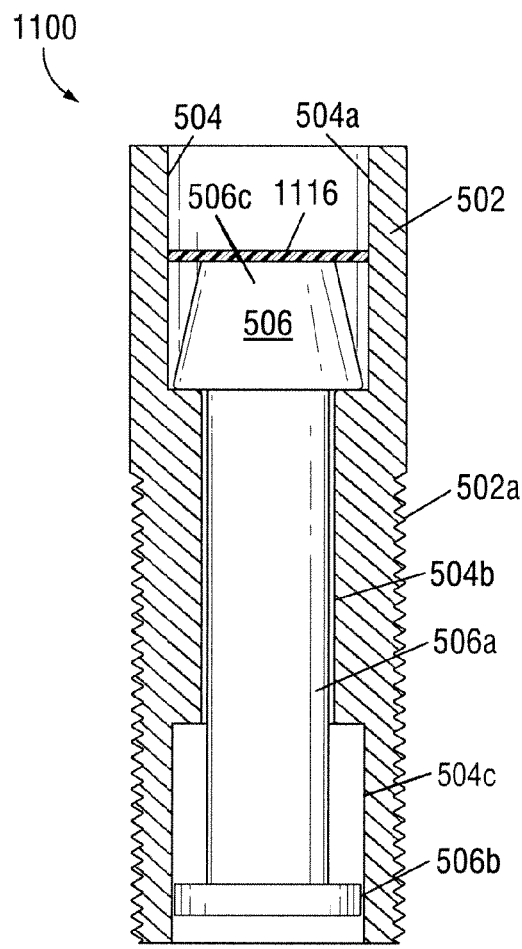
FIG. 11A is a side cross-sectional view of another indicator device before activation.
Figure 11B:
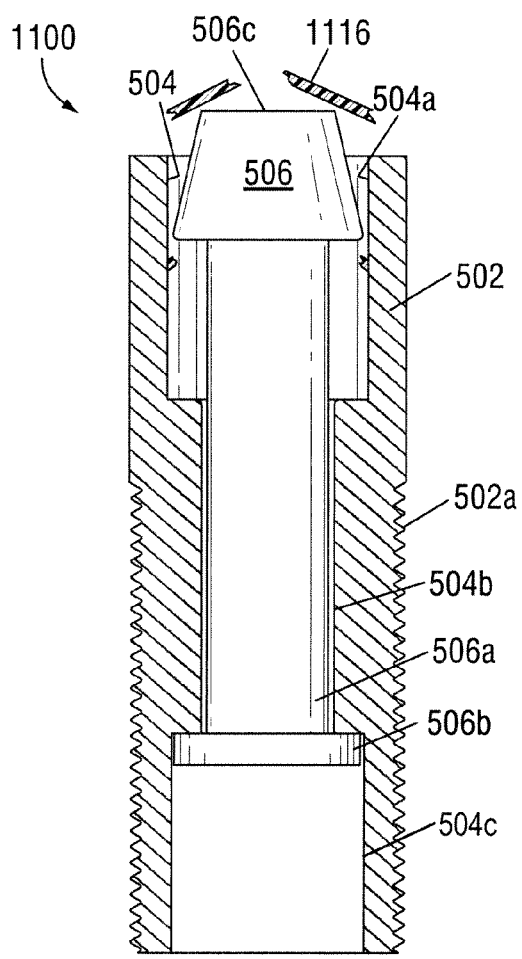
FIG. 11B is a side cross-sectional view of the indicator device of FIG. 11A after activation.

Referring to FIGS. 11A-11B, an exemplary embodiment of an indicator device 1100 is illustrated. The indicator device 1100 is the same as that described above with regard to indicator device 500, except as specifically stated below. For the sake of brevity, the similarities will not be repeated hereinbelow. The spring 516 of indicator device 500 is removed and replaced with a breakable membrane 1116 to hold the indicating component 506 in place. The membrane 1116 is positioned adjacent to and above the indicating component 506, thus preventing the indicating component 506 from exiting the first portion 504a of the bore 504. In certain exemplary embodiments, the membrane 1116 is a thin plastic film or a neoprene cover. In certain exemplary embodiments, the membrane 1116 is secured to the interior of the bore 504 with the use of an adhesive, such as glue, a snap-fit connection, or a retaining clip. The bore 504 also includes a third portion 504c having the disc 506b positioned and movable therein. The diameter of the third portion 504c is greater than the diameter of the second portion 504b. In certain exemplary embodiments, the length of the third portion 504c is such that the disc 506b does not extend out of the sleeve 502

The indicator device 1100 can be used with the conduit system 600 (FIGS. 6A-6B). When the membrane 1116 is intact or in the normal state (FIG. 11A), the indicating portion 506c is positioned entirely within the first portion 504a of the bore 504. When a sufficient force is applied to the disc 506b, such as from an expanding sealing compound, the membrane 1116 breaks (FIG. 11B), thus causing at least a portion of the indicating portion 506c to move out of the first portion 504a of the bore 504 and indicate that the indicator device 1100 has been activated.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. The terms in the claims have their plain, ordinary meaning unless otherwise explicitly and clearly defined by the patentee.

What is claimed is:

1. An electrical enclosure comprising:
    an enclosure housing comprising at least one enclosure housing wall that forms a cavity;
    an expanding sealing compound disposed in the cavity of the electrical enclosure, wherein the expanding sealing compound has an insubstantially expanded state and a substantially expanded state, wherein the expanding sealing compound is in the insubstantially expanded state when the expanding sealing compound is placed in the cavity;
    an indicator device coupled to the enclosure, wherein the indicating device comprises:
        an indicator device housing comprising at least one indicator device wall forming a bore therein, wherein the at least one indicator device wall comprises an outer surface that is disposed within an aperture that traverses the at least one enclosure housing wall; and
        an indicator placed in the bore, wherein the indicator is retained in the bore by a retaining feature when the expanding sealing compound is in the insubstantially expanded state in the cavity, and wherein the retaining feature releases the indicator when the expanding sealing compound is in the substantially expanded state in the cavity,
    wherein the expanding sealing compound, in the insubstantially expanded state, occupies a small volume of space in the cavity, and
    wherein the expanding sealing compound, in the substantially expanded state, occupies substantially all of the cavity.

2. The electrical enclosure of claim 1, wherein the enclosure housing is located in a hazardous environment.

3. The electrical enclosure of claim 1, wherein the cavity has at least one piece of electrical equipment disposed therein.

4. The electrical enclosure of claim 1, wherein at least a portion of the indicator device housing is disposed in the cavity.

5. The electrical enclosure of claim 1, further comprising:
a first damming device disposed within the cavity of the enclosure housing, wherein the first damming device segregates the cavity into a first cavity portion and a second cavity portion, wherein the indicator device and the expanding sealing compound are disposed in the first cavity portion.

6. The electrical enclosure of claim 5, wherein the expanding sealing compound, in the substantially expanded state, occupies substantially all of the first cavity portion and substantially none of the second cavity portion.

7. The electrical enclosure of claim 5, further comprising:
a second damming device disposed within the first cavity portion of the enclosure housing, wherein the second damming device segregates the first cavity portion into a third cavity portion and a fourth cavity portion, wherein the indicator device and the expanding sealing compound are disposed in the third cavity portion.

8. The electrical enclosure of claim 7, wherein the expanding sealing compound, in the substantially expanded state, occupies substantially all of the third cavity portion and substantially none of the fourth cavity portion.

9. The electrical enclosure of claim 7, wherein the expanding sealing compound, in the substantially expanded state, isolates a hazardous condition in the first cavity portion from the fourth cavity portion.

10. The electrical enclosure of claim 1, wherein the expanding sealing compound, in the substantially expanded state, applies a force to the indicator that causes the retaining feature to release the indicator.

11. The electrical enclosure of claim 1, wherein the at least one enclosure housing wall is substantially cylindrical, as in the shape of a conduit.

12. The electrical enclosure of claim 1, wherein the at least one enclosure housing wall comprises an extension that extends away from the cavity, wherein the indicator device housing is coupled to the extension.

13. The electrical enclosure of claim 12, wherein the extension has mating threads disposed along its inner surface, wherein the indicator device housing has complementary mating threads disposed along its outer surface, and wherein the mating threads and the complementary mating threads mate with each other.

14. The electrical enclosure of claim 13, wherein the mating threads and the complementary mating threads form a flame path when the mating threads and the complementary mating threads mate with each other.

15. The electrical enclosure of claim 1, wherein the retaining feature comprises a latch held in place by and coupled to a spring and a pin, the spring having a central axis extending therethrough, wherein the latch is pivotable about the central axis.

16. The electrical enclosure of claim 15, wherein the latch engages a top portion of the indicator, wherein the expanding sealing compound is in the substantially expanded state overcomes a restrictive force of the spring, which disengages the latch from the top portion of the indicator and which allows at least some of the top portion to exit the bore.

17. The electrical enclosure of claim 1, wherein the retaining feature comprises a spring disposed around a shaft of the indicator, wherein the expanding sealing compound compresses the spring when the expandable sealing compound is in the substantially expanded state.

18. The electrical enclosure of claim 17, wherein the indicator further comprises a disc disposed at an end of the shaft of the indicator proximate to the cavity, wherein the disc retains the spring.

19. The electrical enclosure of claim 18, wherein the spring is disposed between the disc and the indicator device housing.

20. The electrical enclosure of claim 1, wherein the retaining feature comprises a breakable member that covers a distal end of the indicator device housing, wherein breakable member is fractured by the indicator when the expandable sealing compound is in the substantially expanded state.

* * * * *